(12) United States Patent
Bellifemine

(10) Patent No.: US 8,821,010 B2
(45) Date of Patent: Sep. 2, 2014

(54) TEMPERATURE MEASURING METHOD, PARTICULARLY OF A HUMAN OR ANIMAL PATIENT

(75) Inventor: Francesco Bellifemine, Varese (IT)

(73) Assignee: Tecnimed S.R.L., Vedano Olona (IT)

( * ) Notice: Subject to any disclaimer, the term of this patent is extended or adjusted under 35 U.S.C. 154(b) by 1098 days.

(21) Appl. No.: 12/794,223

(22) Filed: Jun. 4, 2010

(65) Prior Publication Data

US 2010/0274154 A1    Oct. 28, 2010

Related U.S. Application Data

(63) Continuation-in-part of application No. PCT/IB2008/055066, filed on Dec. 3, 2008.

(30) Foreign Application Priority Data

Dec. 4, 2007    (IT) .................................. MI07A2270

(51) Int. Cl.
*G01J 5/00*    (2006.01)
*A61B 5/01*    (2006.01)
*G01J 5/02*    (2006.01)
*G01J 5/08*    (2006.01)
*G01J 5/06*    (2006.01)

(52) U.S. Cl.
CPC ................. *G01J 5/0022* (2013.01); *G01J 5/089* (2013.01); *G01J 5/0815* (2013.01); *G01J 5/08* (2013.01); *G01J 5/02* (2013.01); *G01J 5/0025* (2013.01); *G01J 5/0275* (2013.01); *G01J 5/025* (2013.01); *G01J 2005/068* (2013.01)
USPC ............ 374/121; 374/130; 374/131; 600/549

(58) Field of Classification Search
USPC .......................... 374/121, 130, 131; 600/549
See application file for complete search history.

(56) References Cited

U.S. PATENT DOCUMENTS

| | | | |
|---|---|---|---|
| 3,535,016 A | 10/1970 | Malifaud | |
| 4,121,574 A | 10/1978 | Lester | |
| 4,315,150 A | 2/1982 | Darringer et al. | |
| 4,743,122 A | 5/1988 | Yamano et al. | |
| 4,854,730 A | 8/1989 | Fraden | |
| 4,910,717 A | 3/1990 | Terry | |
| 5,017,018 A | 5/1991 | Iuchi et al. | |
| 5,115,815 A * | 5/1992 | Hansen | 600/474 |
| 5,352,039 A | 10/1994 | Barral et al. | |
| 5,388,907 A | 2/1995 | Aoyama et al. | |
| 5,439,442 A * | 8/1995 | Bellifemine | 604/65 |
| 5,626,424 A | 5/1997 | Litvin et al. | |
| 5,740,809 A * | 4/1998 | Baratta | 600/474 |

(Continued)

FOREIGN PATENT DOCUMENTS

| | | |
|---|---|---|
| CH | 662438 A5 | 9/1987 |
| DE | 19528590 | 2/1997 |

(Continued)

*Primary Examiner* — Sean Dougherty
(74) *Attorney, Agent, or Firm* — Pearne & Gordon LLP

(57) ABSTRACT

A temperature measuring method comprises a step of detecting, by an infrared thermometer, the intensity of an infrared radiation coming from a region of interest of a patient for determining the patient's temperature, and a step of pointing a target area that is coincident with the region of interest and is the even and smooth surface of a body having a homogeneous underlying vascularization, and being preferably devoid of hair or chitinous or keratinous skin formations.

17 Claims, 3 Drawing Sheets

(56) References Cited

U.S. PATENT DOCUMENTS

| | | | |
|---|---|---|---|
| 5,800,386 A * | 9/1998 | Bellifemine | 604/65 |
| 5,800,504 A * | 9/1998 | Bellifemine | 607/145 |
| 5,820,264 A | 10/1998 | Tsao et al. | |
| 5,839,829 A | 11/1998 | Litvin et al. | |
| 6,196,714 B1 * | 3/2001 | Bellifemine et al. | 374/121 |
| 6,386,757 B1 | 5/2002 | Konno | |
| 6,527,439 B1 * | 3/2003 | Bellifemine | 374/121 |
| 6,742,927 B2 * | 6/2004 | Bellifemine | 374/121 |
| 7,001,066 B1 * | 2/2006 | Bellifemine | 374/121 |
| 7,336,987 B2 * | 2/2008 | Laurence et al. | 600/474 |
| 7,357,570 B2 * | 4/2008 | Schuele | 374/120 |
| 7,364,356 B2 * | 4/2008 | Dicks et al. | 374/121 |
| 7,410,291 B2 * | 8/2008 | Koch | 374/163 |
| 7,651,266 B2 | 1/2010 | Bellifemine | |
| 8,128,280 B2 * | 3/2012 | Bellifemine | 374/121 |
| 2002/0123690 A1 | 9/2002 | Fraden | |
| 2002/0181539 A1 | 12/2002 | Sato et al. | |
| 2003/0099277 A1 * | 5/2003 | Bellifemine | 374/121 |
| 2004/0125854 A1 | 7/2004 | Liu et al. | |
| 2005/0185695 A1 | 8/2005 | Hollander | |
| 2005/0271117 A1 | 12/2005 | Grassl et al. | |
| 2007/0016074 A1 * | 1/2007 | Abreu | 600/475 |
| 2008/0187022 A1 | 8/2008 | Bellifemine | |
| 2008/0194983 A1 * | 8/2008 | Laurence et al. | 600/549 |
| 2008/0262782 A1 | 10/2008 | Pompei et al. | |
| 2010/0091813 A1 | 4/2010 | Bellifemine | |
| 2010/0113894 A1 * | 5/2010 | Padiy | 600/301 |
| 2010/0274154 A1 * | 10/2010 | Bellifemine | 600/549 |
| 2013/0215928 A1 * | 8/2013 | Bellifemine | 374/121 |

FOREIGN PATENT DOCUMENTS

| | | |
|---|---|---|
| DE | 29912619 U1 | 1/2000 |
| DE | 10 2004 027443 B3 | 7/2005 |
| GB | 2291498 A | 1/1996 |
| JP | 1095245 A | 4/1989 |
| WO | 9202792 A1 | 2/1992 |
| WO | 9801730 A1 | 1/1998 |
| WO | 2007054821 A | 5/2007 |

* cited by examiner

TEMPERATURE MEASURING METHOD, PARTICULARLY OF A HUMAN OR ANIMAL PATIENT

FIELD OF THE INVENTION

The present invention relates to a method of measuring the temperature, in particular of a human or animal patient, exploiting use of an infrared thermometer.

DESCRIPTION OF RELATED ART

It is known that beside traditional thermometers, such as mercury thermometers with temperature reading by contact with the patient, infrared thermometers have been presently widespread on the market, which are capable of detecting the temperature of a given subject based on infrared emission generated therefrom; these thermometers operate through a sensor detecting the infrared radiation emitted from the body region thermal detection of which is to be carried out.

A particular type of infrared thermometer are the so-called "non-invasive thermometers" which are such structured that the sensor member is maintained at a distance (i.e. without a material contact) from the surface of the subject whose thermal level is wished to be known; in this type of thermometers, the thermometer is to be positioned at a predetermined distance, within well limited ranges relative to the detection surface (this is because the detecting sensor must receive the only infrared emissions coming from a predetermined area of the patient, with high selectivity).

Generally, the non-invasive contactless thermometers to be positioned "at a distance" typically measure the temperature of a given portion of the patient's forehead, which temperature, due to the nature of the area submitted to measurement, is highly affected by the room temperature where the patient is; for instance, in a patient having a predetermined inner temperature, the temperatures of his forehead surface will be different depending on whether he/she is in a hot environment or in a cold environment.

While the known technique briefly described above has enabled reliable measurements of the patient's temperature to be obtained, it however has some limits and/or operating drawbacks.

It is to be noted, in fact, that the non-stabilisation of the thermometer in the environment where said thermometer is involves generation of wrong measurements; for instance, should the thermometer stay in an environment with a temperature different from that of the environment where the subject submitted to temperature measurement is, the room temperature detected by the thermometer would be different from that required for achieving a correct estimate of the patient's temperature.

In addition, a restriction in the possible areas intended for detection (that, as seen above, are substantially confined to the area of the patient's head) results in an important restriction in the operating flexibility of non-invasive thermometers; let us think, for instance, about the veterinary applications where temperature measurements on an animal must take into account the fact that most of the animal's skin is covered with hair.

A similar drawback is given under those conditions in which the patient's forehead (be it a human being or an animal) is not perfectly accessible, due for instance to a particular position of the subject or to the presence of covering garments and/or protection garments and/or irremovable bandages, or due to the presence of sweat on the subject's forehead.

Under this situation, the invention aims at substantially solving the above mentioned drawbacks, and in particular at conceiving a temperature measuring method utilising a non-invasive thermometer with measurement at a distance and without direct contact, and that does not present the hitherto encountered limitations in terms of "target area".

Simultaneously, the present invention aims at conceiving a temperature measuring method that can be advantageously applied both to human and animal patients (of various species or races).

Another aim of the invention is to make available a temperature measuring method capable of solving the problem concerning lack of stabilisation of the environment where the thermometer is.

A further aim of the invention is also to allow a more reliable measurement of the patient's temperature avoiding detection mistakes due to an incorrect measurement of the room temperature.

Consequently, it is a general aim of the invention to make available an infrared thermometer provided with all necessary technical features for good operation, i.e. correct pointing to a distance, correct conveying of the infrared radiation with exclusion of the radiation from regions not of interest (or the radiation from other body's regions), as well as correct estimate of the forehead temperature and the room temperature so as to be able to reliably determine the patient's true temperature.

The foregoing and further aims that will become more apparent in the following of the present description are substantially achieved by a device and a method in accordance with the invention.

Further features and advantages will be best understood from the detailed description of a preferred, but not exclusive, embodiment of a temperature measuring method, in particular the temperature of a human or animal patient, and of the related thermometer suitable for use in the method in accordance with the present invention.

BRIEF DESCRIPTION OF THE DRAWINGS

This description will be taken hereinafter, with reference to the accompanying drawings, given by way of non-limiting example, in which.

DETAILED DESCRIPTION OF THE PREFERRED EMBODIMENTS OF THE INVENTION

Figure 1:
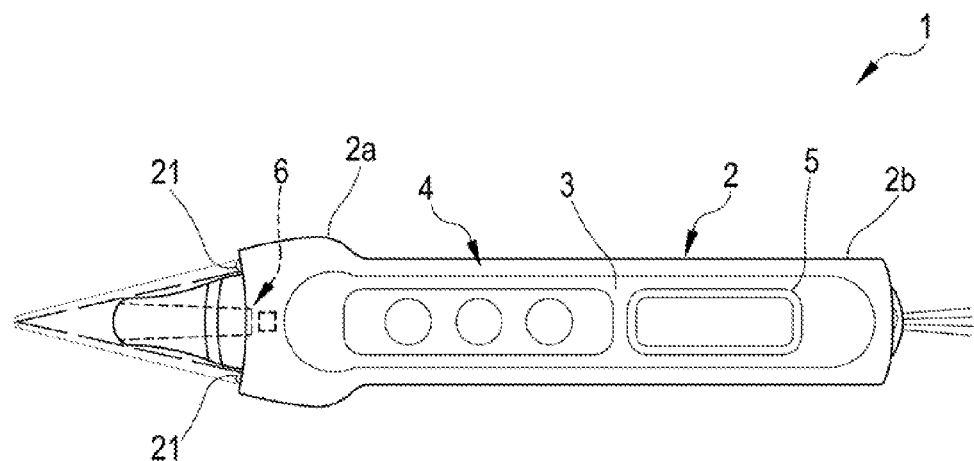
FIG. 1 is a diagrammatic whole view of an infrared thermometer.

With reference to the drawings, a temperature measuring device, generally for measurement of a patient's temperature, has been generally identified with 100. As viewed from FIG. 1, the infrared thermometer 1 can be of the portable type and it comprises a main holding body 2 defining a grasping region 3 for the user.

The handgrip can have conventional command means 4 such as keypads and the like, as well as one or more displays 5 possibly for temperature or other information reading.

At one end of the main body, means 6 for detecting the infrared radiation is provided which comprises a sensor member 7 sensing the infrared radiation intensity and at least one waveguide 8 operatively associated with the sensor member to suitably convey thereto the radiation emitted from the region of body 9 the thermal level of which is wished to be measured.

Obviously, in case of contact or sliding thermometers, use of any type of waveguide can be selectively avoided.

Advantageously, the temperature measuring device is provided with means for controlling the correctness/stability of the room-temperature value used by the thermometer.

As already pointed out, the infrared thermometer 1 is designed to detect the temperature of a surface portion 9 of a patient by means of the sensor member 7, to be subsequently able to estimate the patient's true inner temperature.

As previously highlighted, in order to be able to estimate the true temperature, it is also necessary to know the room temperature of the place where the patient is.

In fact, the outer surface temperature of a subject is generally affected by the room temperature where the patient is, and is different from the patient's true inner temperature. Obviously, based on the room temperature, a corrective parameter can be established which is adapted to act on the true surface temperature measured by the sensor member 7 to obtain a reliable reading of the patient's true inner temperature. In other words, for each infrared thermometer 1 a measurement of the room temperature is required which must be as reliable as possible, and in particular a measurement of the room temperature where the patient is.

Figure 2:
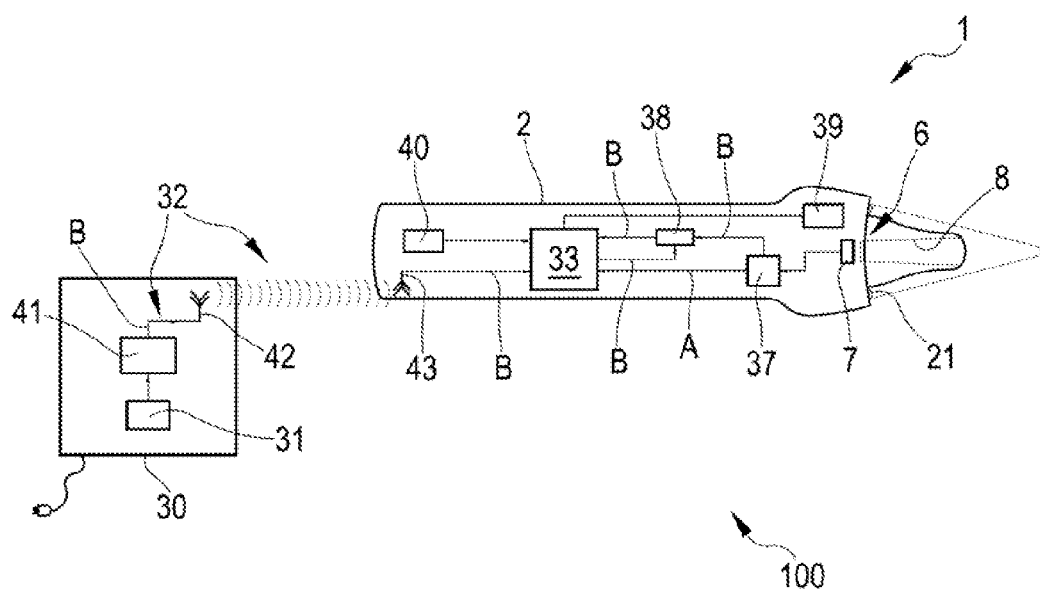
FIG. 2 is a diagrammatic view of the temperature measuring device in accordance with the present invention.

In this connection and as shown in FIG. 2, the temperature measuring device can comprise a container or support 30 separated from the infrared thermometer 1 and designed to communicate the room temperature to the latter.

To this aim use of a remote sensor 31, a thermistor for example, is provided which is designed to detect the room temperature; thermistor 31 will be housed in a circuit external to the infrared thermometer, power supplied by a mains outlet or by a suitable battery, for example; the same circuit can contemplate the presence of displaying means such as a display enabling reading of the room temperature detected by the remote sensor 31.

Generally the support 30 will be permanently positioned inside a place where the temperature measurement is to be carried out in such a manner that the remote sensor 31 can detect the true room temperature irrespective of the place where the infrared thermometer is kept and of the temperature variations to which said infrared thermometer is submitted.

In particular, by communication means 32, the room temperature detected by the remote sensor 31 will be transmitted to the infrared thermometer.

Sensor 31 sends the detected-temperature signal to a control unit 41 which through a suitable antenna or transmitter 42, communicates the measurement via radio, infrared emission or equivalent system, to a corresponding antenna or receiver 43 present on thermometer 1.

The infrared thermometer generally also comprises a processing unit 33 which is associated in a circuit to the sensor member 7 to receive therefrom the temperature signal A proportional to the infrared radiation perceived by the sensor member itself and coming from the patient.

This processing unit 33 will be also designed to receive, as an input, the room-temperature signal B from the remote sensor 31. Alternatively, the processing unit 33 will be able to immediately use this room-temperature signal B or transfer it to a memory 38 for use at a subsequent time.

Before, during or after carrying out the temperature measurement on a patient, the processing unit 33 will receive as an input the room-temperature signal B and the temperature signal proportional to the infrared radiation A; the room temperature signal B will enable the processing unit 33 to determine a corrective parameter which may be a positive, negative or zero parameter, for rectifying the temperature detected by the sensor member 7 and determine the patient's true inner temperature.

In this connection, the processing unit 33 will comprise suitable parameterized corrective functions that, depending on the room temperature, will determine said corrective parameter that in turn will enable a reliable reading of the patient's true inner temperature to be obtained.

Figure 4:
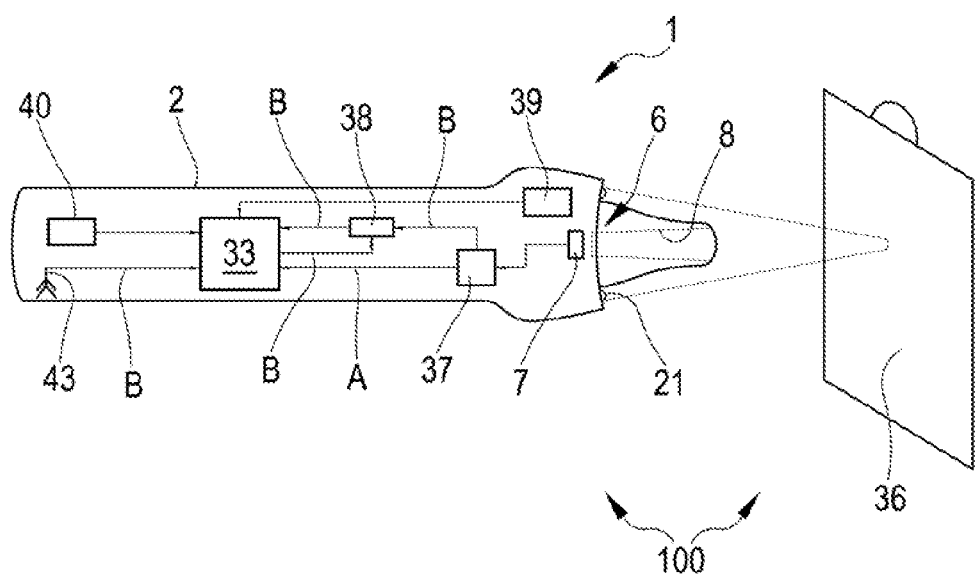
FIG. 4 diagrammatically shows an alternative embodiment of the temperature measuring device seen in FIG. 2.
Figure 5:
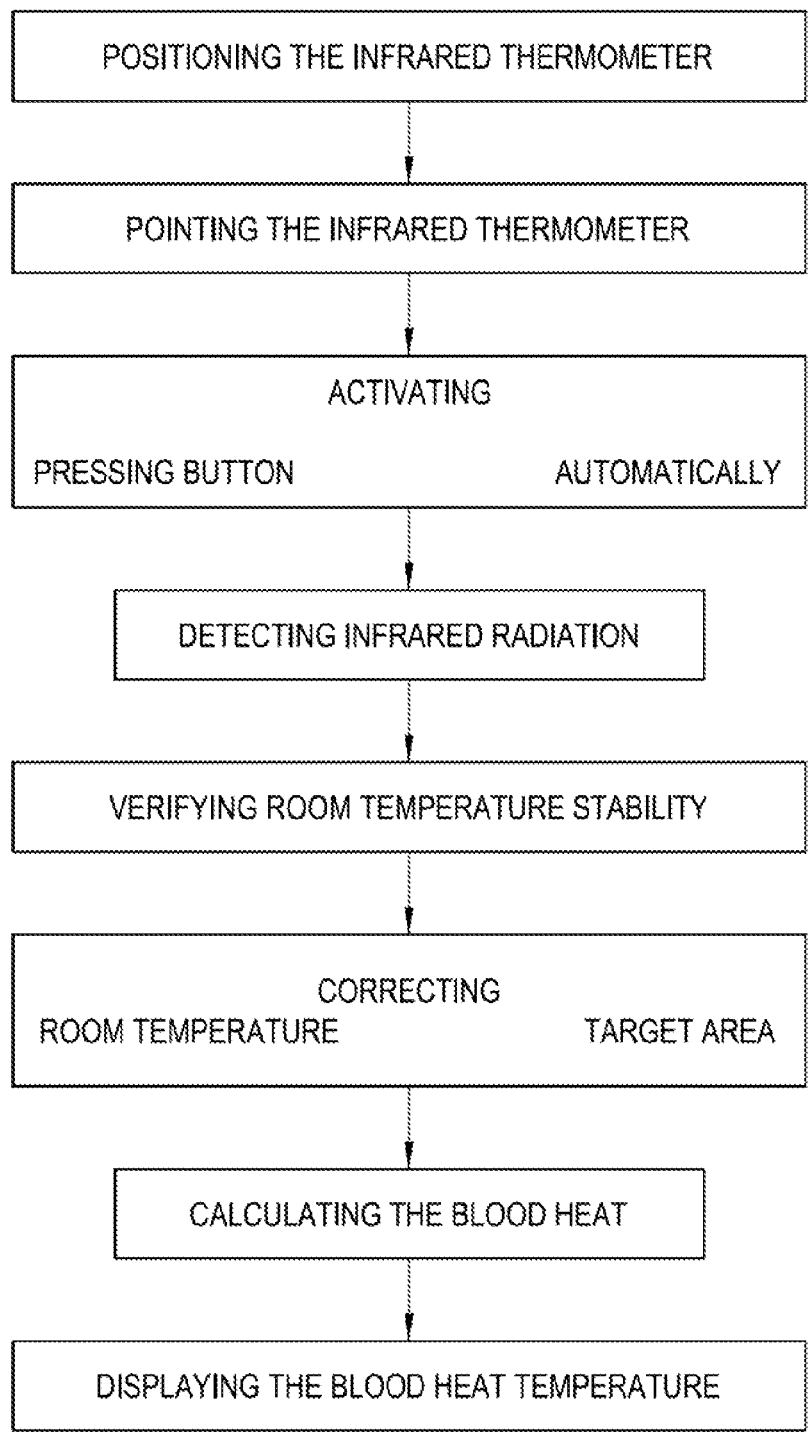
FIG. 5 is a flow chart of the invention.

In an alternative embodiment shown in FIG. 4, the temperature measuring device will advantageously comprise a reference element 36 at room temperature which is distinct from the infrared thermometer 1 and positioned in the environment or place the temperature of which is wished to be known.

In other words, this reference element 36 can consist of a plate or disc preferably of plastic material or thin paperboard, hanging from or attached to a point of a wall in the place the temperature of which is to be detected, far from heat or cooling sources, or from sunbeams.

More generally, the reference element 36 can even consist of any body, wall or piece of furniture in a given environment, provided it has been therein for a sufficiently long time (so as to have a stabilised temperature) and is not positioned too close to heat sources or excessively cold points. In other words, this reference element 36 will exactly take the room temperature as required for optimal operation of the thermometer.

When the operator designed to carry out the temperature measurement enters the place where the patient is, he/she sets himself/herself in front of the plate 36 with the infrared thermometer, points said thermometer to the centre of the reference element 36 and using a suitable room-temperature loading function, measures the infrared radiation coming from the reference element 36 itself by means of the sensor member 7 (thereby determining the temperature as a function thereof).

At this point suitable means 37 for detecting the temperature of the reference element 36 deviates the measured temperature signal B towards a memory 38 in which the received value is substituted for the one previously stored, as the room temperature to be used during all subsequent measurements on patients.

Then the operator can use the thermometer to measure the patient's forehead temperature again by the same sensor member 7 that this time will detect the temperature signal A sent to the previously mentioned processing unit 33.

Said processing unit 33 will utilise the patient's temperature signal A and the room-temperature signal B stored in memory 38 for determining the true value of the patient's inner temperature.

By way of example, this operating method could be advantageous for temperature measurements carried out on patients in a hospital room where the nurse will have the same room-temperature reference for all patients in the same room and will be able to reset the correct room temperature on moving to the subsequent room (or, in the case of animals, on moving inside one or more cattle sheds).

The temperature detecting means 37 of the reference element 36 can obviously be activated by the operator that by pressing one or more predetermined buttons will signal to the thermometer that the room temperature B is about to be detected, by pressing a different button or one or more of the same buttons but using a different modality will signal to the thermometer that, on the contrary, the detected temperature A is the patient's temperature.

As a further alternative, it is to be pointed out that the infrared thermometer 1 can be provided with a first and a second room-temperature sensors 39, 40 that are internal to the main holding body and both designed to detect the external-environment temperature and to transmit it to the processing unit 33.

This processing unit 33 will receive as an input the temperature signals from sensors 39, 40 and calculate the room temperature as a function of the two detection operations carried out (note that three or more sensors could possibly be used).

In a simpler embodiment, the processing unit 33 will take the lower value measured by the two thermistors as the room-temperature value; this embodiment is based on the assumption that if the thermometer becomes hot due to an unstable situation (because it is being handled or because or is in a pocket), this does not occur in the whole structure in a constant manner.

As an alternative, a software can be also implemented, such that the microprocessor can estimate the true room temperature calculating it as a value that is a function of the difference between the temperatures supplied by the two thermistors 39, 40.

As a further alternative embodiment for room temperature control and verification, said temperature can be continuously detected by a single temperature sensor 39 or 40 transmitting the detected temperature to the processing unit 33 constantly over time. The processing unit 33 will store into memory 38, as the room temperature, the last temperature that has remained constant in value and over time. The room temperature will be generally considered as constant in value if it keeps within a predetermined variation threshold, within a variation of 0.2°, for example. Constancy over time will be established by giving the measurements a predetermined duration parameter, 15 seconds for example, or also 1 or more minutes.

Should temperature keep constant in value (with a variation not exceeding 0.2°) and over time (unchanged for more than 15 seconds or more than 1 or several minutes), this temperature would be stored into memory 38 and used as the room temperature to carry out the necessary corrections to the temperature detected on the patient.

It is apparent that should the thermometer be transferred between different places or also introduced into an operator's pocket, the detected room-temperature variations would have to be disregarded, so as to avoid errors being introduced into the measurement to be carried out.

Obviously the processing unit 33 is able, through suitable algorithms, to generate a thermal reading that is then transferred to the display or shown to the user through other displaying systems, such as a projection system for example.

With reference to the other parts of the infrared thermometer 1, it is to be pointed out that the waveguide 8 has a first end 8a facing the body the temperature of which is wished to be known, and a second end 8b facing the sensor member 7.

As can be viewed from the accompanying drawings (FIG. 3), the waveguide is structured like a tubular body having a mirror-like inner surface 10 defining a passage capable of bringing a first and a second opening 11 and 12 of the tubular body, opposite to each other, into optical communication.

The inner surface 10 of the waveguide has a converging extension towards the second opening 12, i.e. its inner diameter becomes increasingly smaller on moving from the first opening 11 of the waveguide 8 to the second opening where the sensor member 7 is substantially located. More specifically, the waveguide 8 convergence is increasingly more marked as the second opening 12 of the tubular body is approached.

In other words, the waveguide in accordance with the present invention can have two or more axially consecutive sections having their respective convergence which is constant in each section and progressively more marked going from one section to the subsequent one in the direction of, and towards the second opening 12 of the tubular body defining the waveguide.

Practically, in the just described case, at least the converging portion of the waveguide will appear as a succession of frustoconical surfaces tapering of which is increasingly more marked as the second opening 12 is approached.

Alternatively, in place of two or preferably a plurality of consecutive sections with greater and greater convergence, a waveguide can be provided in which the inner surface is curved and progressively and continuously converges in a more and more marked manner from the first opening towards the second opening.

At all events, the waveguide in accordance with the invention is such made that, the axial moving forward towards the second opening being the same, the diametric reduction becomes increasingly bigger on moving from the first to the second opening.

In the waveguide shown by way of example, it is possible to notice that the inner surface 10 of the waveguide is defined by arched lines 13, 14 and, preferably, by arcs of conic sections with an axis coincident with the longitudinal symmetry axis L of the waveguide and the concavity of which faces the first opening 11.

As shown, the convergence of these parabola arcs is always greater on moving closer to the second opening 12.

It is to be advantageously pointed out that the waveguide in accordance with the invention at the first opening can have no protection masks such as those typically provided on traditional waveguides for these uses and therefore it must be submitted to periodic cleaning by the users to ensure the necessary performance (or it must be protected with a suitable removable protection). The possible absence of a protection mask is very advantageous because a useless loss of signal in the radiation entering the waveguide is thus avoided.

Figure 3:
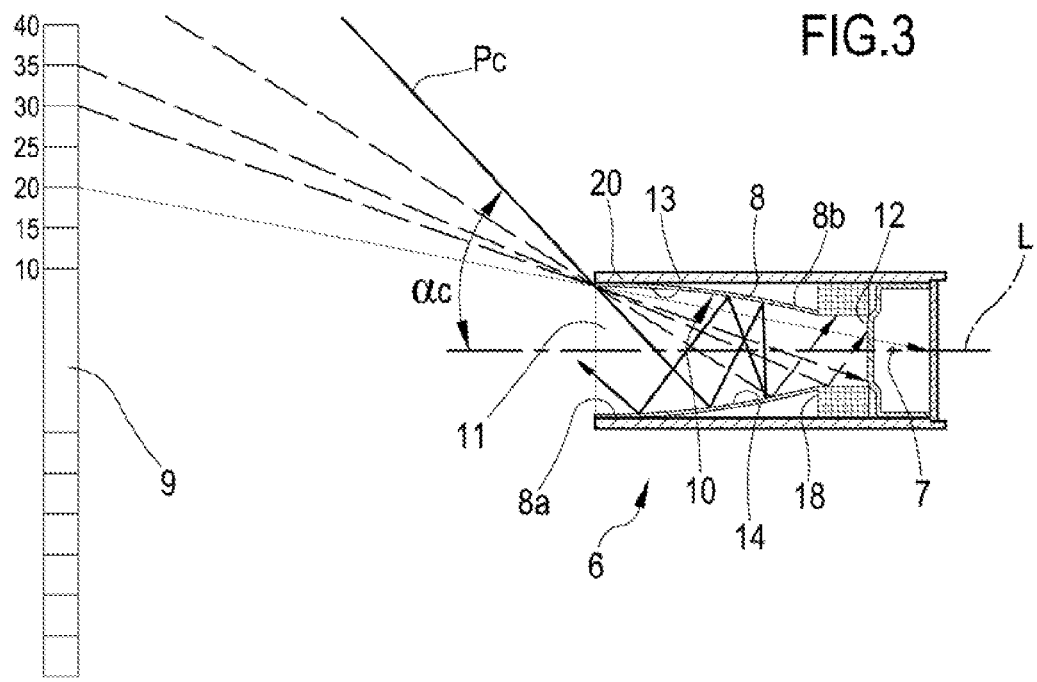
FIG. 3 shows a waveguide plus the sensor of the thermometer shown in FIGS. 1 and 2.

It is to be noticed that, irrespective of the structure given to the waveguide 8, said waveguide as well as the sensor member 7 operatively associated therewith are typically housed within an auxiliary tubular body 20 of metal material, preferably copper or a Zn+Al+Mg alloy, shown in particular in FIG. 3, although the same can form a single structure.

The infrared thermometer in accordance with the present invention can also be provided with control means operatively associated with the holding body and cooperating with the processing unit; this control means is designed to determine a condition of correct positioning of the sensor member 7 to a predetermined distance "D" from the detection area, which correct-positioning distance is deemed to be optimal for execution of a careful reading and delimitation of the reading area to the concerned region alone.

Obviously all the above highlighted systems can be used on contact and/or on sliding thermometers too.

It is clear that in addition to the above described particular shaping of the waveguide in accordance with the invention, a correct positioning to a suitable distance D between sensor member and detection surface helps in obtaining a very accurate thermal reading.

As to its accomplishment, said control means can consist of different technical solutions to be adopted either alone or in combination with each other.

In particular use of light emitters or pointing lights 21 can be provided (see FIG. 1). Specifically, two or three visible light beams can be provided, which must preferably be non-coplanar with each other and convergent.

After the above description mainly given from a structural point of view, operation of the temperature measuring device and the infrared thermometer being part thereof, is the following.

First of all the room temperature B is detected. This measurement can be carried out following one or more of the above described methods.

Generally the temperature measuring device using infrared radiation can contemplate all the four solutions outlined above that can be selectively activated either by the operator or automatically, depending on the established priorities.

For instance, where all the four possibilities of room-temperature detection were implemented, one could decide on giving priority to the temperature transmitting system by the remote sensor 31.

Should said remote sensor be absent (or disabled) the room temperature could in any case be set through use of the reference element 36 by a manual operation. Even if this operation were not carried out, the room temperature would be calculated depending on the temperatures detected by sensors 39 and 40 and, should this option too be absent or disabled, the room temperature would be calculated using the last temperature that has remained constant over time and in value and that is stored in memory 38.

After completing calculation of the room temperature and storing it into memory 38 for example, then measurement of the patient's temperature is carried out by conveying the infrared rays coming from the concerned region 9 of the patient by means of the waveguide 8.

By virtue of the shape of the inner surface of the waveguide that becomes progressively convergent to an increasingly greater extent on moving close to the sensor member, the following effects are substantially present: the radiation emissions directed parallel to the longitudinal axis of the waveguide or slightly inclined to said axis are conveyed by the waveguide and substantially focused on the sensor member, irrespective of the region where they come into contact with the inner surface of the waveguide.

Conversely, the rays having an excessive inclination and coming from a region of the patient's surface that is not of interest, which can distort the thermal detection, can be returned to the inlet opening of the waveguide following multiple reflections (practically, at each reflection there is an increase in the ray inclination until overcoming 90° relative to the waveguide axis, as represented by the critical ray $r_c$ in FIG. 3).

Generally, due to the conformation of the inner surface of the waveguide, the rays having a greater inclination with respect to the longitudinal axis of the waveguide do not succeed in reaching the second opening of the waveguide to which either rays having a small inclination can come (that will strike on the sensor member) or rays that, depending on the inclination, can be absorbed by an absorber member (if any), or reflected by the end edge of the waveguide (if present), or yet break against the inner or outer walls of the holding body of the sensor member.

It is however apparent that, due to the conformation given to the waveguide and the detecting portion in its different embodiments herein described, a great reduction in the real detection region of the radiation is obtained and above all a precise definition of same on the surface of the body to be measured; in fact the waveguide represents a kind of optical filter for the radiation coming from directions that are too inclined relative to the longitudinal axis of the guide itself.

Obviously the waveguide 8 and the control means designed to determine the condition of correct positioning of the sensor member 7 to the distance "D" of the detection area 9 will enable an optimal measurement of the patient's surface temperature.

From a general point of view, it is to be noted that the different structural and operational features of the above illustrated devices can be combined with each other (as stated in the appended claims, for example), or can also co-exist in a separate and independent manner, giving rise to alternative embodiments of the present invention.

In particular, apart from the inner structure of the infrared thermometer 1, it will be possible to define "apparatuses" that, as they operationally comprise the thermometer 1 inside them, can have the following two sub-assemblies separately or in combination with each other, depending on the specific cases:

an "active" support 30 separated from the infrared thermometer and having a remote temperature sensor, as well as the suitable communication means for transmitting the temperature detected by the remote sensor to the infrared thermometer; and/or a "passive" reference element 36 at room temperature, that is separated from the main holding body 2, as well as means 37 for detecting the temperature B of the reference element 36 and set it as the room temperature for the infrared thermometer 1.

In turn, the infrared thermometer in accordance with the invention can have the following sub-assemblies in combination with each other or separately:

a single room-temperature sensor 39; and/or a second room-temperature sensor 40, that will be able to detect a room temperature B in an independent manner with respect to the first sensor 39; and/or a processing unit 33 capable of storing a progress in time of the room-temperature signal B and adapted to keep as a reference of the room temperature, the last temperature that has remained substantially constant over a predetermined time interval.

Due to the different construction architectures described above, a method of measuring a patient's temperature can be advantageously implemented, which first of all comprises a step of detecting, by an infrared thermometer 1, the intensity of the infrared radiation from a region of interest 9 of a patient (for the purpose of determining the temperature in said region of interest).

Conveniently, the present method can further comprise a step of measuring a room temperature, as described in more detail below/this step of measuring the room temperature can be useful for determining the correctness of the patient's temperature measurement.

Advantageously, this method involves a step of pointing a target area that is not limited to the head and/or forehead region of a given patient: more generally, the step of pointing the target area is carried out by identifying a body surface which is even and smooth and has a homogeneous underlying vascularisation, and on which preferably there is no hair and no chitinous or keratinous skin formations.

In accordance with the target area properties identified above by the present method, it is possible for instance not only to point to the forehead portion or temple of a patient, but also to the navel, the tip of the nose, the eye (the cornea surface, for example), the rear part of the ear (or in other words the outer part of the auricle).

Within the scope of the present invention, determination of some target areas (such as the cornea surface or the tip of the nose) enables application of this method also to animals. In fact these areas are clearly without hair, irrespective of the type of animal, and therefore are not affected by the shielding action exerted by hair.

To the aims of the present invention it is specified that the area defined as "target area" practically is coincident with the already mentioned "region of interest" identified with reference 9 in the accompanying drawings.

Conveniently, the just described (and subsequently claimed) method may further comprise a step of controlling the stability/correctness of the room temperature used for correcting the temperature of the region of interest.

In order to ensure correct operation of the method (that, as well apparent, is put into practice using non-invasive thermometers maintained to a distance relative to the surface the temperature of which one wishes to know), a correction step is conveniently present for correcting/rectifying the temperature detected on the region of interest as a function of the room temperature (in order to determine the patient's true inner temperature).

In more detail as to this method, it is clear that it also comprises an acquisition step for acquiring the room temperature from a remote sensor 31 statically placed in a place or environment where temperature measurement is to be carried out, or in a place having the same temperature as that of the place where said measurement takes place.

Depending on current requirements, the acquisition step can take place via radio, infrared radiation, contact, jack plug, cable, induction, electromagnetic waves, ultrasonic waves, microwaves, transponder or similar remote communication means.

Likewise, the acquisition step too can be automatic and/or upon command by the user. For example, acquisition can take place by the user typing in the value read on the remote apparatus or any other temperature sensor (which can even be a common mercury thermometer or an electronic one, but completely independent of the inventive device); the user draws this temperature and transfers it to the infrared thermometer 1 through a keypad incorporated therein or other similar means.

According to the present method, the acquired room-temperature value is stored into a memory 38 and used to process a corrective parameter adapted to rectify the temperature of the region of interest to determine the patient's true inner temperature; in addition, the controlling step comprises a measurement of the room temperature by detection of the intensity of an infrared radiation from a reference element 36 at room temperature.

Conveniently, the acquired room-temperature value is stored into a memory 38 and is used for processing a corrective parameter adapted to rectify the temperature of the region of interest to determine the patient's true inner temperature; in addition, the controlling step comprises measurement of the room temperature by detecting the intensity of an infrared radiation from a reference element 36 at room temperature.

In addition, in the present method the controlling step may also be provided to comprise measurement of the room temperature by at least two different room-temperature sensors 39, 40; in this way, the stored room temperature is a function of the two temperatures detected by sensors 39, 40.

Advantageously, the stored room temperature is the lowest of the detected room temperatures, so as to obtain the maximum reliability and consistency of the correction according to the present method; in particular, the true room-temperature estimate is obtained by a correction referred to the difference in the temperatures provided by sensors 39, 40.

The controlling step may comprise a sub-step of verifying whether the detected room temperature is constant in value and over time, so that the room temperature used for rectifying the temperature detected from the region of interest appears to be the last-stored detected value of constant temperature.

It is to be noted that in a particularly appreciable embodiment of the present method, the value of the room temperature is considered as constant if it remains within a predetermined correction threshold, within variations of 0.2° for example, and at the same time the room temperature is considered as constant over time if it remains within the predetermined correction threshold over a period of time of five minutes, for example.

The temperature results produced by the above described method (as claimed in the following) are displayed to the operator using the most appropriate ways depending on current requirements; for instance, the controlling step may comprise a step of direct acquisition, through reading of the room temperature on a display and writing it by means of a possible keypad on the infrared thermometer or by means of a possible selector of the electric or electromechanical type (through setting of a switch selector, for example).

Within the scope of the present invention, by "uniform variation" it is intended a variation according to a given time function of room-temperature variation; it is in fact to be noted that the greater the difference between the starting temperature and the final temperature is, the higher the speed variation. For instance, with a thermometer coming from a room with a 10° C. difference, the temperature variation speed during the first residence minute of the thermometer in the room will be very high (1° C./minute, for example). In the second minute the variation will be smaller (0.9° C./Minute, for example), while in the third residence minute the variation could be further reduced (0.81° C./minute, for example) and so on during the following minutes.

If, during a predetermined period of residence time of the thermometer in a given place or environment the temperature variation value is put out of the estimable time curve, this means that conditions altering the stabilisation process have arisen (maybe, because the thermometer has been touched or moved or because the room temperature has changed).

According to a peculiar feature of the invention, the present method may further comprise, a step of predicting a room temperature which is obtained by interpolation and/or extrapolation of subsequent temperature values detected at predetermined time intervals by a single room temperature sensor (that in the accompanying figures can be sensor 39); in particular, this predicting step is carried out only after checking that the above mentioned single room temperature sensor 39 has registered a predetermined temperature increase or reduction rate.

If, on the contrary, the thermometer is provided with two or more room-temperature sensors, the predicting step can be conveniently carried out by interpolation and/or extrapolation of subsequent temperature values detected at predetermined time intervals by at least one pair of room temperature sensors (39, 40); consistently with the above described embodiment of the method, this predicting step will be carried out only after checking that both room temperature sensors (39, 40) have registered the same temperature increase or reduction rate.

In other words, a further advantageous feature of the present method consists in the possibility of implementing a room-temperature predicting step; in more detail, this predicting step can be carried out by extrapolation (and/or, if this is the case, by interpolation) of subsequent temperature values detected at predetermined time intervals by sensors 39, 40 or by only one of them, should the device be provided with a single sensor.

In other words, the predicting step can involve sampling of different temperature values, so as to be able to construct a "time curve" that typically will tend to an asymptotic value (which, in turn, can be considered as the room temperature to which the thermometer will stabilise after some time). In addition, the possibility of at least partly using physico/mathematical formulas (also already known) can be contemplated for determining stabilisation times and/or room-temperature values through calculation.

Conveniently, the predicting step can be put into practice conditionally on verification that both room-temperature sensors 39 and 40 will record the same temperature increase or reduction rate; in fact this correspondence condition entails that the infrared thermometer 1 is not subjected to factors of alteration of the room temperature (such as the fact that it is held in the operator's hand or it is put in a garment pocket close to the human body) and that it is actually exposed to the true temperature of the environment where the patient is.

Operatively, the predicting step comprises a sub-step of determining a positive or negative temperature variation, uniform over time, either of sensors 39, 40, or of one alone of them if the device is provided with a single sensor.

Following determination of this variation (or in other words, of the "time curve"), it is advantageously possible to identify a corrective parameter as a function of the room temperature interpolated and/or extrapolated during the predicting step; after this corrective parameter has been defined (which can be calculated based on empirical formulas or obtained by statistical analysis and then stored in the most suitable ways), the method of the present invention can contemplate application of said corrective parameter to the measured temperature.

The step of predicting the room temperature can therefore give rise to the definition of an "expected" value of room temperature of equilibrium that will be calculated and stored in a very short period of time (and will therefore enable immediate use of thermometer 1) or can be used for starting a counting step of a stabilisation time of the thermometer; in the last-mentioned alternative embodiment, instead of establishing the "asymptotic" temperature of the aforesaid "time curve", the time for reaching the asymptotic temperature is established and therefore a "countdown" can be configured (by suitable displaying on the thermometer display, for example) on expiry of which the thermometer will be really stabilised to the room temperature and ready for use with the greatest accuracy and/or precision. Alternatively, the countdown step will mean that at the end of it, even if the thermometer is not really stabilised, the expected room-temperature value will be displayed and/or inserted in memory 38 to be subsequently used for the purpose of identifying the right corrective coefficient to be applied.

Another peculiar feature of the present invention resides in that the method herein considered can be applied to different parts of the body, temperature of which is wished to be known; for instance, detection of the intensity of an infrared radiation coming from a "region of interest" 9 of a patient can advantageously comprise a sub-step of detecting the infrared radiation coming from the auricle area.

Still with regard to possible "regions of interest" or "target areas" (these two expressions being practically equivalent to the aims of the present invention), detection of the infrared radiation from one eye or both eyes of the patient is advantageously possible; so it is advantageously possible to select this region of interest in the veterinary field or at all events where the skin of the patient's forehead is not freely accessible from an operating point of view (due to covering of said region with hair, head-hair or other objects).

In a further aspect of the present invention it has been found extremely interesting to use as a possible target area the eyelid.

In detail the contactless infrared thermometer is manually held through a hand grip portion, for example by an operator, and it is manually positioned at a prefixed distance from the eyelid of a patient whose blood heat is wished to be known.

The target area is then manually pointed in order to have the infrared sensor of the thermometer substantially aligned with the eyelid so that the infrared radiation coming from this specific target area can enter the waveguide and can be directed (both directly and by reflection) towards the sensor.

When the infrared thermometer is activated by the user, detection of the infrared radiations starts and lasts for a prefixed time interval.

During detection of the infrared radiation coming from the target area, the contactless infrared thermometer is manually handled and the distance between an infrared sensor and the target area can vary even if it is clear that maintaining the correct distance improve the measurement.

Generally thermometer activation is performed manually by pressing at least one specific activation button usually positioned on the handgrip portion.

In other words, when thermometer is correctly positioned at a prefixed distance and the sensor is pointing the target area, the operator presses the activation button and detection of the infrared radiation automatically starts.

In particular the infrared radiation is detected for a prefixed time interval (generally, but not necessarily, less than one second is required).

In other words, a timer starts a countdown after pressing the activation button and detection is performed until the countdown ends.

Then the blood heat temperature is displayed, for example on a digital display on the thermometer body, or on the body surface by projection or on a different electronic device such as a computer.

It is to be noted that in general, the contactless infrared thermometer is exclusively manually handled through an handgrip portion during manual positioning step, during manual pointing step, during activation of the contactless infrared thermometer step and during detection of the intensity of the infrared radiation.

As previously described, the temperature of the target area is to be corrected in order to determine the blood heat.

In this respect at least a correction based on the specific target area under measurement is made (the correction factor or function will be in principle different in case the target area is the eyelid or the nose or the ethmoid sinus, etc).

Such a correction could be in principle constant for a specific target area, but in general is also function of the measured or known room temperature.

In other words different room temperatures generate different target area temperatures which could anyway correspond to the same blood heat of the patient.

In other words again the eyelid temperature of a patient staying in a very cold area will be different from the eyelid temperature of the same patient having the same blood heat, but staying in a hot environment.

Therefore the control unit associated to the contactless infrared thermometer receiving the intensity of the infrared radiation coming from the target area will correct either temperature of the target area before obtaining the blood heat or will obtain the (uncorrected) blood heat and then the same is corrected as a function of the measured room temperature. It is of course to be noted that choosing a specific target area having a stable temperature (possibly independent from the room/environment temperature) could help in increasing reliability of blood heat measurement.

This problem is even more relevant when it is not possible taking into account the right room temperature, for example because the patient is moving trough different temperature environments and it is not exactly known the temperature at which the target area of the patient is stabilized. A similar problem occurs in very cold environments, such as at the entrance of a public structure (school, airport, company, etc.) during, for example, winter season.

Indeed in such a situation the temperature between the target area temperature and the blood heat is high and errors in measurement increase.

In this respect it has been found at the upper eyelid, which is protected when the eye is open, usually has a more stable temperature (upper eyelid temperature is more stable than other exposed target areas, e.g. the forehead or the auricle). Moreover the upper closed eyelid is also not generally affected by sweat.

In this respect the measurement method can require the patient to close at least one eye just before infrared radiation is taken from the upper closed eyelid.

Other extremely interesting target areas which can have good behavior in respect of the above mentioned issues, are the Canthus (the eye portion close to nose sinus; i.e. either corner of the eye where the upper and lower eyelids meet) and the external surface of the Ethmoid Sinus (either the skin portion between the eye and the nasal septum).

All the above mentioned technical features and effects described with respect to the eyelid can also apply to the Canthus and to the Ethmoid Sinus.

Advantageously, if the patient's eye is to be used as the target area (or, more generally, direct displaying of the target area on the patient is made necessary), the present method can involve a step of displaying the target area by projection of a pointing shape around the target area itself.

This pointing shape that can be obtained by projection of a light beam of suitable geometry, circumscribes the target area and therefore gives an indication as to the part of the patient's body the infrared radiation of which is being detected.

Should the selected target area consist of an eye, the pointing shape has a conformation adapted to at least partly circumscribe a predetermined eye portion; advantageously, this predetermined eye portion can be a cornea portion and/or a pupil and/or an iris of the eye.

It is clear that if the selected target area is a portion of an eye, it is not possible to directly use light beams for pointing/determining the target area and the correct distance.

In this respect the projection of light beams as above mentioned is generally used for determining the correct distance and/or for circumscribing the target area.

Circumscribing the target area allows to correctly pointing the contactless infrared thermometer indicating also that the infrared radiation is taken mainly from a center of the circumscribing beams positioned around the target area.

In general the projections will be outside the eye, even it the target area could be the eye only or a portion of the eye only. Indeed it won't be desirable to take infrared radiations coming to eyelashes and eyebrow affecting the measurement even if these body portions will be (at least in part) within the circumscribed area.

It is evident that collecting radiations from non-interesting body portions could negatively affect the temperature calculation.

The pointing shape can have any conformation (for instance, it can have a circular, oval or polygonal conformation and can be open or closed, depending on current requirements); in this way, the operator will be able to correctly point the thermometer to the eye without directing the light beam constituting the pointing shape towards the pupil (thus avoiding the retina being impinged on by the light beam and therefore the patient being troubled).

From the structural point of view, the step of displaying the target area by projection of a pointing shape involves the presence on the thermometer of suitable means for defining and projecting the pointing shape itself; it is to be noted that the just described structural feature can also apply to other types of thermometers, and can be utilised in temperature detecting methods different from the method herein described and claimed.

Unlike known temperature detecting methods in which insertion of a probe into the auricle occurs, this method variant in accordance with the invention does not contemplate insertion of a probe into the auricle but, on the contrary, keeps any measuring object out of said auricle, which is advantageous in terms of non-intrusiveness on the patient.

In order to take into account the fact that usually a patient's forehead is less hot than the auricle (since the forehead is more exposed to the ambient air), the present method can also comprise a sub-step of determining an additional corrective parameter; this additional corrective parameter will typically be correlated with the surface temperature difference existing between the forehead region of a patient and the auricle of the same patient, and obviously the method can contemplate application of said parameter to the temperature measured at the auricle.

Conveniently, if one wishes to choose the patient's eye (or eyes) as the "target area", the aforesaid additional corrective parameter would be preferably correlated with the surface temperature difference existing between a frontal region of a patient and one eye and/or both eyes of the same patient.

Temperature checking by analysis of the auricle (or the eye surface) is also advantageous if the patient's forehead is not in the optimal conditions for a direct measurement, in the presence of sweat for example or in all cases capable of modifying the characteristics of an infrared emission.

In accordance with the method hitherto described, detection of the infrared radiation emitted from the target area (also referred to as "region of interest") can advantageously be carried out using the so-called "contactless" thermometers, i.e. non-invasive thermometers that can/must be maintained to a given distance from the target area; however, should it be required by the current moment, the method of the invention can also be implemented using invasive thermometers and/or thermometers operatively brought into direct contact with the target area of the subject whose temperature is wished to be measured.

The invention achieves important advantages.

It will be recognised first of all that the adopted methods enable much more flexibility in application, a range of target areas being identified that can be used alternatively depending on the different operating situations and/or the different impediments that may arise for reaching some target areas rather than others.

In addition, the present method, through a suitable selection of the target areas, can be implemented both on human beings (or hairless animals) and on animals provided with an even thick fur or at all events a fur capable of exerting a strong shielding effect on the infrared radiation emitted by the true skin of the animal.

It is then apparent that the above described (and hereinafter claimed) optional steps of the method also allow stabilisation in the thermometer place or environment. Each of the described methods and devices in fact enables a more precise detection of the room temperature or possibly a control of same.

It is apparent that adoption of a true and real room temperature allows more reliable measurements to be carried out which are not affected by accidental external events such as variations of the thermometer room temperature that do not correspond to temperature variations in the environment where the subject whose temperature is to be measured is; the invention enables problems to be solved which are connected with situations in which wrong positioning or use of the thermometer (in a physician's pocket for example, or in case of too much handling of the thermometer or also in case of a patient's sweaty forehead) could invalidate the temperature measurement.

The above, preferably but not necessarily associated with use of a suitable waveguide capable of reducing the field of view of the sensor to the real region of interest, as well as with suitable means for positioning the thermometer to the correct distance, enables precise measurements to be obtained which are repeatable and suffer from substantially minimum or zero errors.

In any case all systems for stabilisation/control of the room temperature and the waveguide can be also applied to contact or sliding thermometers.

The invention claimed is:

1. A temperature measuring method comprising the following steps:
   manually positioning a contactless infrared thermometer at a distance from a target area of a patient whose blood heat temperature is to be measured;
   manually pointing the contactless infrared thermometer at the target area;
   activating the contactless infrared thermometer;
   detecting, by the contactless infrared thermometer and for a prefixed time interval, an intensity of an infrared radiation coming from at least the target area of the patient, wherein said target area is an ethmoid sinus of a human patient;
   determining the temperature of said target area by means of said infrared radiation detected intensity;
   collecting the temperature of the target area;
   determining a blood heat temperature by correcting the collected temperature of the target area; and
   displaying the blood heat temperature.

2. A method as claimed in claim 1, comprising the step of handling the contactless infrared thermometer through a handgrip portion during the manual positioning step, during the manual pointing step, during activation of the contactless infrared thermometer step and during detection of the intensity of the infrared radiation.

3. A method as claimed in claim 1, comprising the step of shutting at least one eye and detecting the intensity of an infrared radiation coming from the upper closed eyelid.

4. A method as claimed in claim 1, comprising a step of measuring a room temperature and a step of correcting the collected temperature of said target area as a function of the measured room temperature.

5. A method as claimed in claim 1, comprising a step of measuring a room temperature and a step of correcting the blood heat temperature as a function of the measured room temperature.

6. A method as claimed in claim 4, comprising a step of controlling a correctness of the room temperature used for correcting the collected temperature of the target area.

7. A method as claimed in claim 1, wherein the step of activating the contactless infrared thermometer is a step of manually activating the contactless infrared thermometer by pressing at least one button on the contactless infrared thermometer.

8. A method as claimed in claim 1, wherein, after activating the contactless infrared thermometer, detection for a prefixed time interval of the intensity of an infrared radiation coming from the target area starts automatically.

9. A method as claimed in claim 1, wherein, after activating the contactless infrared thermometer, a timer starts a countdown, the detection being performed for the prefixed time interval during the countdown and since the countdown ends.

10. A method as claimed in claim 1, comprising the step of determining a correct measuring distance of an infrared sensor from the target area, said determination being performed during the step of manually positioning the contactless infrared thermometer.

11. A method as claimed in claim 10, wherein the step of determining a correct measuring distance comprises sending at least two non-coplanar light rays towards the target area, the correct distance being determined through superimposition of corresponding light spots on the target area.

12. A method as claimed in claim 10, wherein the step of determining a correct measuring distance comprises sending at least an ultrasonic ray towards the target area and receiving a reflected ultrasonic ray, the correct distance being determined sensing a time interval between sending and receiving the ultrasonic ray.

13. A method as claimed in claim 1, wherein during detection of the infrared radiation coming from the target area, the contactless infrared thermometer is manually handled and the distance between an infrared sensor and the target area can vary.

14. A temperature measuring method comprising the following steps:
   manually positioning a contactless infrared thermometer at a distance from a target area of a patient whose blood heat is to be measured;
   manually pointing the contactless infrared thermometer at the target area;
   manually activating the contactless infrared thermometer;
   detecting, by the contactless infrared thermometer and for a prefixed time interval, an intensity of an infrared radiation coming from at least the target area of the patient, wherein said target area is one eye of a human or animal patient;
   displaying the target area by projection of a pointing shape around said target area, said pointing shape is obtained by projection of at least a light beam at least partly circumscribing the target area, wherein the pointing shape circumscribes an area bigger than the target area;
   determining a correct distance of the infrared thermometer from the target area by means of said light beam projection;
   determining the temperature of said target area by means of said infrared radiation detected intensity;
   collecting the temperature of the target area;
   correcting the collected temperature of the target area for determining a blood heat temperature; and
   displaying the blood heat temperature.

15. A method as claimed in claim 14, wherein in the detecting step the pointing shape circumscribes the eye without projecting the light beam directly on the eye.

16. A method as claimed in claim 14, wherein the pointing shape has a conformation to at least partly circumscribe a predetermined portion of an eye, said predetermined eye portion being chosen in the group comprising a cornea portion and/or a pupil and/or an iris of an eye.

17. A method as claimed in claim 14, wherein said patient is a non-human animal.

* * * * *